United States Patent [19]
Simmons et al.

[11] Patent Number: 5,871,403
[45] Date of Patent: Feb. 16, 1999

[54] METHOD AND APPARATUS FOR PRODUCING DUAL SYNCHRONIZED THREADS

[76] Inventors: John M. Simmons, 2062 W. 12820 South, Riverton, Utah 84065; Tom M. Simmons, 12862 S. 2040 West, Riverton, Utah 84065

[21] Appl. No.: 178,508

[22] Filed: Jan. 7, 1994

[51] Int. Cl.$^6$ ................................................. B21H 3/02
[52] U.S. Cl. ............................ 470/10; 470/80; 470/199
[58] Field of Search ................................. 470/10, 18, 25, 470/66, 80, 81, 99, 100, 185, 199, 204; 408/24, 25, 111, 118

[56] References Cited

U.S. PATENT DOCUMENTS

| | | | |
|---|---|---|---|
| 1,494,464 | 5/1924 | Cressey | 470/80 |
| 3,344,450 | 10/1967 | Russo | 408/25 |
| 4,170,050 | 10/1979 | Bosse | 470/10 |
| 5,076,744 | 12/1991 | Kitagawa et al. | 470/107 |
| 5,098,232 | 3/1992 | Benson | 407/33 |

*Primary Examiner*—Joseph J. Hail, III
*Attorney, Agent, or Firm*—Prince, Yeates & Geldzahler

[57] ABSTRACT

Method and apparatus are disclosed for forming dual synchronized threads on the interior and exterior cylindrical portions of a tube or pipe, and in the inner and outer cylindrical surfaces of an annular channel formed in an object. The method for producing dual synchronized threads includes initially defining a rotational zero point on the object where the first set of threads is to begin, cutting or forming the first set of threads, determining a rotational zero point on the object where the second set of threads is to begin, the second rotational zero point being relative to the first rotational zero point, and cutting or forming the second set of threads with the same lead as the first so that the two sets of threads will be synchronized and their starting points will be in some specified relationship to each other. An apparatus is also disclosed for cutting dual synchronized threads, the apparatus comprising a combination tap and die for simultaneously cutting dual threads on and in an object. The tap threads and die threads of the combination tap and die are synchronized such that their thread leads are identical, and their rotational zero points are related such that the resulting male and female threads on the object are synchronized.

4 Claims, 7 Drawing Sheets

METHOD AND APPARATUS FOR PRODUCING DUAL SYNCHRONIZED THREADS

BACKGROUND OF THE INVENTION

1. Field of the Invention.

The present invention relates to a method and apparatus for producing dual threads on an object, and more particularly relates to a method and apparatus for producing synchronized dual internal and external threads in/on the cylindrical portion of an object, wherein both sets of synchronized internal and external threads are adapted to engage corresponding synchronized external and internal mating threads on a mating object for effecting the threaded union therebetween.

2. Description of the Prior Art.

It is well known to have a pipe or other cylindrical object that incorporates dual threads, that is a set of male threads on the exterior thereof and a set of female threads on the interior thereof. Heretofore, however, the interior and exterior threads of such cylindrical objects have not borne any relationship to each other, and it has therefore not been necessary to either produce both sets of threads simultaneously or otherwise establish a relationship between the two sets of threads during manufacture. Therefore, traditional methods of cutting or forming exterior and interior threads on/in a cylindrical object have been adequate. In other words, the exterior and interior threads have been formed in conventional manners, as in/on a lathe, milling machine, screw machine, etc., without regard to any relationship between the two sets of threads.

OBJECT OF THE INVENTION

It is therefore an object of the present invention to provide a method and apparatus for forming sets of dual synchronized threads in/on the cylindrical portion of an object, the interior and exterior threads being synchronized with identical leads, and with rotational starting points relative to each other, such that the dual synchronized threads engage mating dual synchronized threads on a mating connector for effecting a positive fluid seal between the two connectors that eliminates the problem of thread separation caused by different rates of expansion of dissimilar connector material.

SUMMARY OF THE INVENTION

One method for forming dual synchronized threads on the cylindrical portion of an object is to, first, cut one set of threads in a conventional manner, thereafter cut the second set of threads in a conventional manner, locating the rotational starting point of the second set of threads in a specific relationship to the rotational starting point of the first set of threads.

This method incorporates the use of a specially designed thread cutting tool having the interior and exterior thread cutting surfaces in a specific relationship to each other, thereby enabling the sets of dual synchronized threads on the object to be cut in specific relationship to each other.

A second method for forming dual synchronized threads on the cylindrical portion of an object is to utilize a combination tap and die of the present invention. This combination tap and die is preformed to cut the interior and exterior threads simultaneously, the threads having identical leads and having their respective rotational starting points in a specified predetermined relationship. This relationship can be such that the respective rotational starting points of the mating synchronized threads are the same, a specified degree (e.g., 180°) out of phase, or even multiple turns on one set of threads out of phase such that a first set of mating threads is positively engaged by multiple turns of the object prior to engagement of the second set of dual synchronized threads. In addition, one or both sets of mating dual synchronized threads can comprise multiple threads, the only limiting factors being that: (1) the leads of both internal and external threads be the same, and (2) the respective rotational starting points of the dual synchronized threads be in specific relationship to each other.

DETAILED DESCRIPTION OF THE INVENTION

Figure 1:
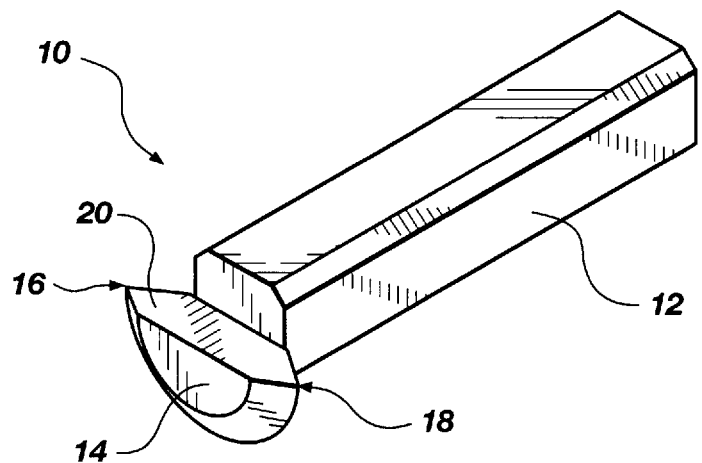
FIG. 1 is a perspective view of a thread cutting tool for cutting dual synchronized threads on the interior and exterior cylindrical surfaces of an object.

Turning now to the drawings, and initially to FIG. 1, a thread cutting tool for cutting dual synchronized threads on a lathe is shown, generally illustrated by the numeral 10. The thread cutting tool 10 comprises a mounting base 12 for holding the tool in the tool post of a lathe in a customary manner. The thread cutting tool 10 includes a cutting end generally illustrated at 14. The cutting end 14 includes a first thread cutting edge 16 and a second thread cutting edge 18. These thread cutting edges 16 and 18 are defined by a flat surface 20 which is coplanar with a diametric plane along the geometric longitudinal axis of the cutting tool mounting base 12, such that the tips 16 and 18 of the thread cutting edges are also coplanar with the cutting tool base longitudinal axis.

The thread cutting edge tips 16 and 18 are also symmetric about a vertical longitudinal plane, and are coplanar within a plane which is normal to the longitudinal axis of the base. In addition, the thread cutting edge tips 16 and 18 are equidistant from the mounting base longitudinal axis in order to more readily facilitate computing thread depth when using the thread cutting tool to cut dual synchronized threads on and in the external and internal cylindrical surface of an object.

Figure 2A:
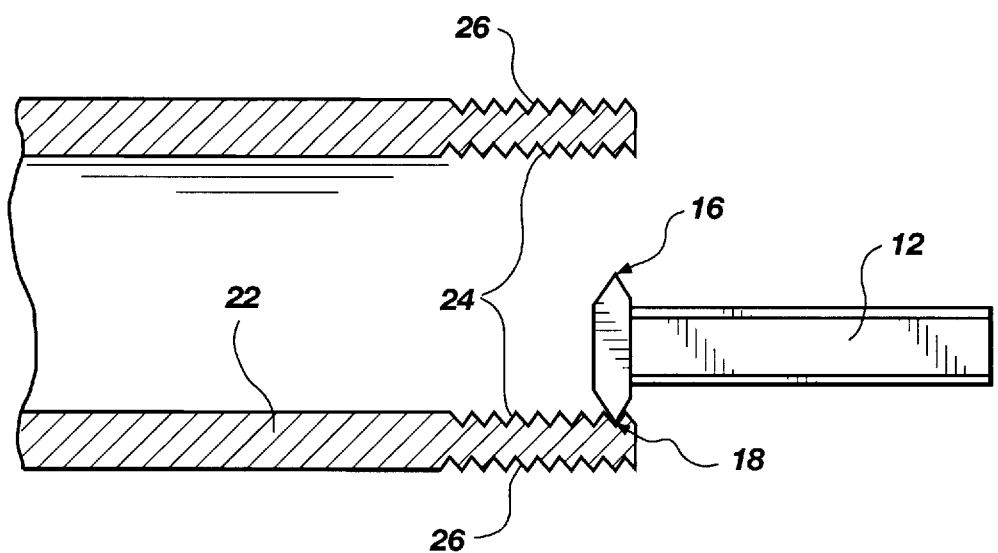
FIG. 2A is a top view taken in section diametrically along the longitudinal axis of a cylindrical object having dual synchronized threads, illustrating the thread cutting tool of FIG. 1 for aligning and cutting the interior threads in the cylindrical object.

FIG. 2A is a diametric sectional view along the longitudinal axis of the cylindrical portion of an object, illustrating the positioning of the thread cutting tool 10 at its rotational starting location to cut female threads on the inside of the cylindrical surface. The first set of threads to be cut, whether it be the internal female threads 24 or the external male threads 26, is cut on the lathe in the customary manner, after setting the lathe lead screw feed speed in order to determine the number of threads per inch to be cut, or inversely, the pitch or lead of the threads. Once this is determined and the proper adjustments are made, the operator determines a rotational zero point on the thread dial on the lathe, which will determine the rotational starting point on the cylinder where the resulting thread is to begin. This rotational zero point having been established, the operator then cuts the internal female threads 24 with the cutting tool second thread cutting edge 18 in a customary manner.

Figure 2B:
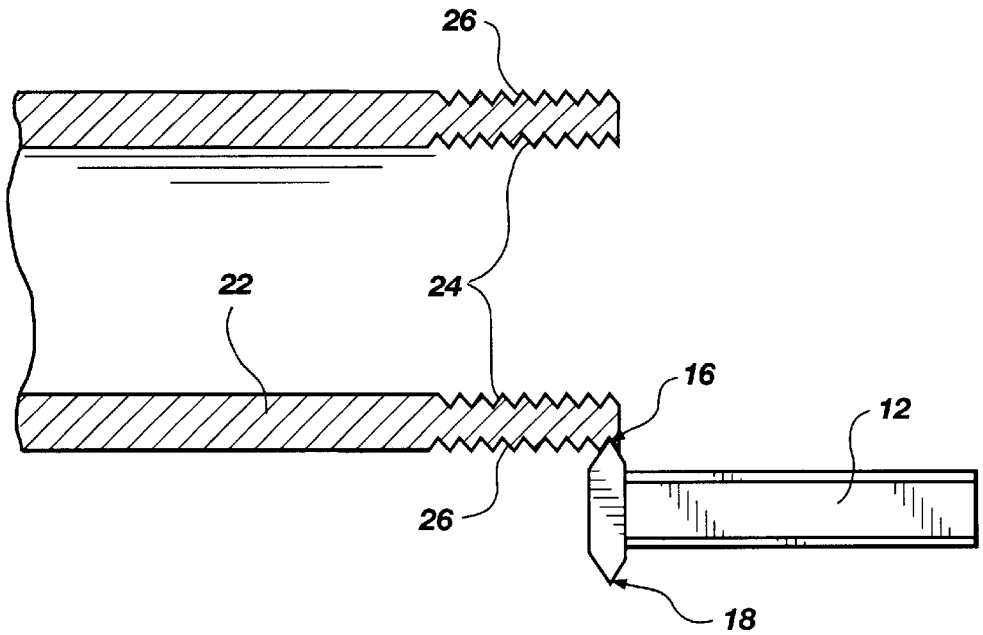
FIG. 2B is a top view taken in section diametrically along the longitudinal axis of a cylindrical object having dual synchronized threads, illustrating the thread cutting tool of FIG. 1 for aligning and cutting the external threads on the cylindrical object.

The operator then prepares to cut the external male threads 26 on the cylinder 22. See FIG. 2B. Maintaining the lathe lead screw feed speed in order to cut the external threads 26 with the same lead as that of the internal threads 24, the operator uses the same rotational zero point on the lathe thread dial to position the cutting tool first thread cutting edge 16 adjacent the external surface of the cylinder 22. By using this same rotational zero point for both sets of threads, both thread sets will be aligned and synchronized together, in terms of identical leads and identical rotational starting points for both thread sets. The operator then cuts the external male threads 26 on the cylinder in the customary manner.

It should be noted that it is customary in thread cutting to make a number of passes along the cylinder, removing only a slight amount of cylinder material with each cutting pass. By so doing, the circularity of the cylinder 22 is maintained, and the resulting threads have a smooth surface for effecting a tight fluid engagement with the mating dual synchronized threads on the mating piece.

Figure 3:
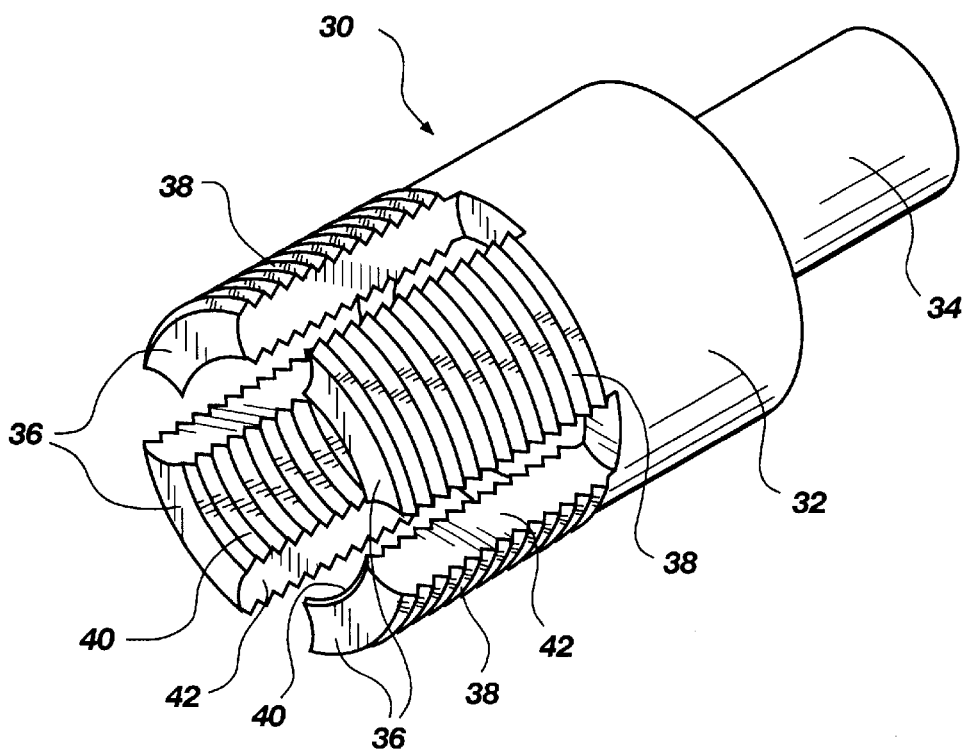
FIG. 3 is a perspective view of a combination tap and die for simultaneously cutting synchronized male and female threads in an annular channel formed in an object.

FIG. 3 is a perspective view of a combination tap and die for simultaneously cutting dual synchronized male and female threads in an annular channel formed in an object, the combination tap and die generally illustrated by the numeral 30. The combination tap and die comprises a body portion 32 and a shank 34. The thread cutting end of the combination tap and die itself resembles a cylinder having four arcuate thread cutting fingers 36, each separated from its adjaent finger by a cut-out that functions as a flute (not numbered).

The individual arcuate thread cutting fingers 36 form a "tap" portion, defined by tapping threads 38 on the external surface thereof for cutting female threads on the interior surface of an annular channel formed in an object. Likewise, the individual arcuate thread cutting fingers 36 form a "die" portion, defined by die threads on the internal surface thereof for cutting male threads on the external surface of the object annular channel. Of course, these tapping threads 38 and die threads 40 are synchronized with each other, having the same lead and rotational thread starting points that are relative to each other in a specific relationship. These tapping threads 38 and die threads 40 each include a combined cutting edge 42 therebetween, defined by the flute between the individual arcuate thread cutting fingers 36.

Figure 4:
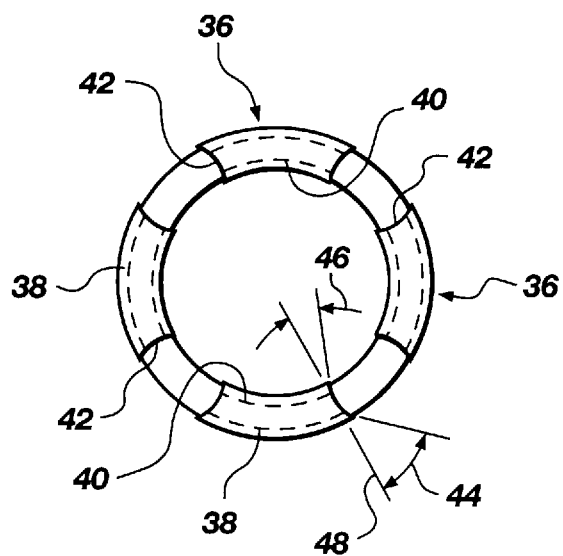
FIG. 4 is an end view of the combination tap and die of FIG. 3.

This cutting edge 42 is more clearly illustrated and explained in FIG. 4, which is an end view of the combination tap and die shown in FIG. 3. In this combination tap and die, the arcuate threat cutting fingers 36 are formed with the cutting edges 42 that are actually curved in order to form positive cutting edge angles 44 and 46 relative to radial line 48, which would represent a zero cutting edge angle.

Figure 5:
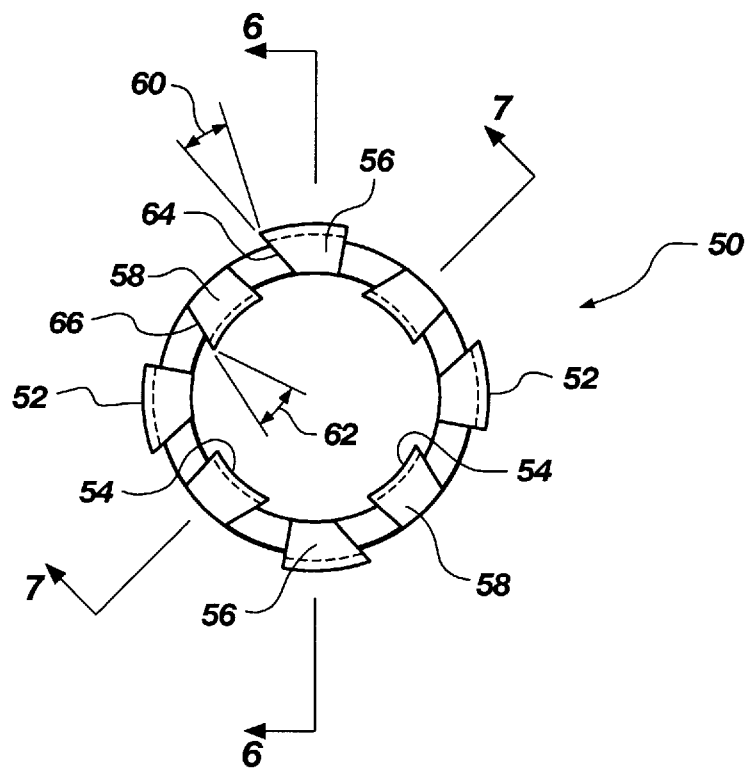
FIG. 5 is an end view of an alternative embodiment of a combination tap and die of the present invention.

FIG. 5 is an end view of an alternative embodiment of the combination tap and die of the present invention, generally illustrated at 50. This alternative embodiment 50 incorporates tapping threads 52 and die threads 54 formed on individual tapping fingers 56, and die fingers 58, respectively, as opposed to the tapping threads 38 and die threads 40, both being formed on a single arcuate thread cutting finger 36 of the embodiment of FIGS. 3 and 4. The tapping threads 52 are formed on the exterior surfaces of the individual tapping fingers 56, and the die threads 54 are formed on the interior surfaces of the individual die fingers 58. By incorporating individual tapping and die fingers, respective tap cutting edge angles 60 and die cutting edge angles 62 can be made greater than respective cutting edge angles in the embodiment of FIGS. 3 and 4, and can be controlled to a greater degree. In addition, inasmuch as each set of tapping threads 52 and die threads 54 is formed on an individual tapping and die finger, 56 and 58, respectively, thread cutting chips can more readily escape from the threaded material through the flutes between the individual tapping fingers and die fingers.

Figure 6:
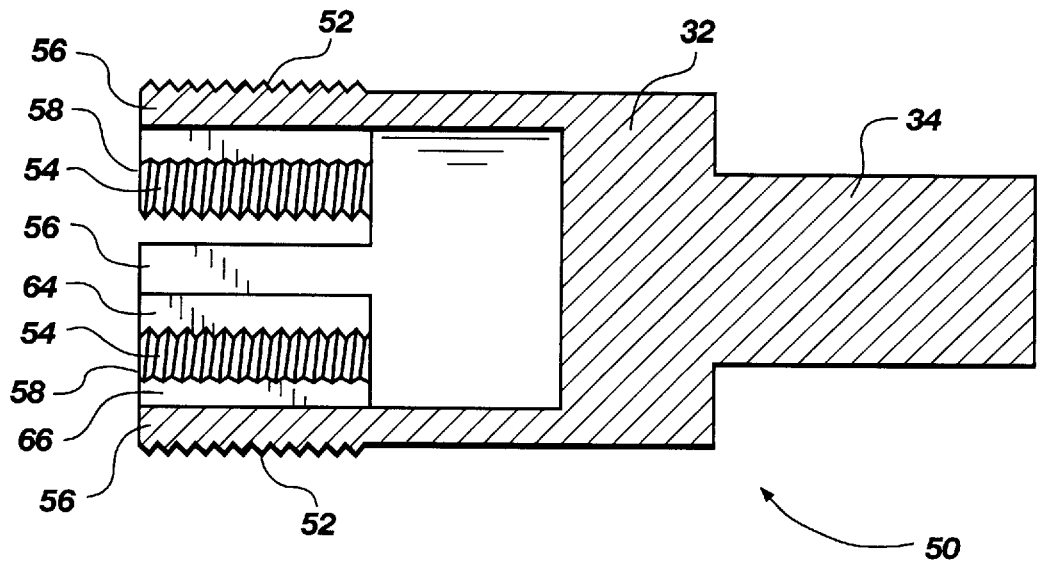
FIG. 6 is a sectional view taken diametrically along the longitudinal axis of the combination tap and die of FIG. 5, taken along lines 6—6 in FIG. 5.

FIG. 6 is a sectional view taken along the longitudinal axis of the combination tap and die of FIG. 5, along lines 6—6 in FIG. 5. FIG. 6 illustrates the tapping fingers 56 having the external tapping threads 52 thereon, and the die fingers 56 having the die threads 54 on the interior surface thereof. In addition, FIG. 6 illustrates the tap cutting edge 64 and die cutting edge 66 of the respective tap and die fingers.

Figure 7:
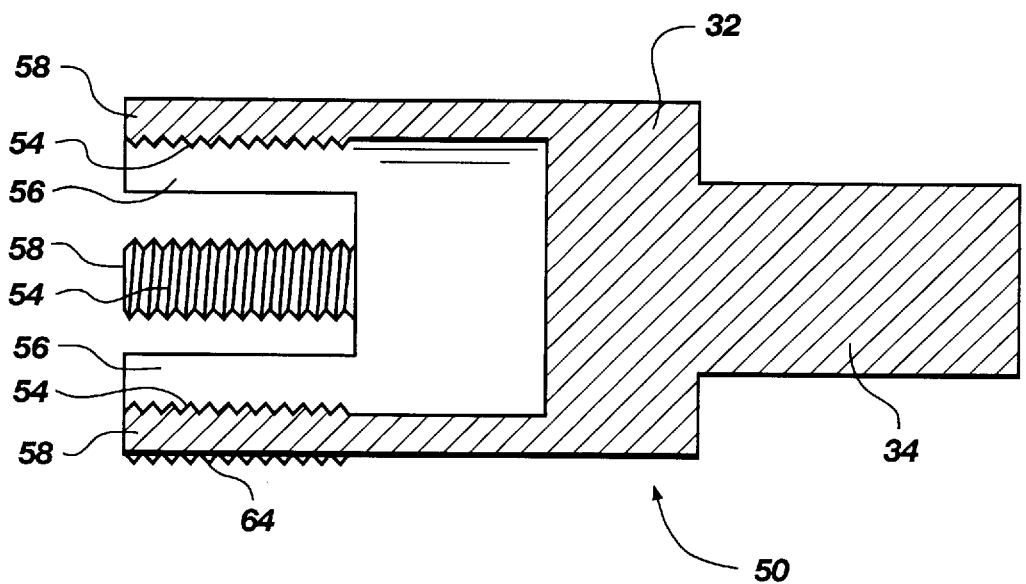
FIG. 7 is a sectional view taken diametrically along the longitudinal axis of the combination tap and die of FIG. 5, taken along lines 7—7 in FIG. 5.

FIG. 7 is a sectional view taken along the longitudinal axis of the combination tap and die, taken along lines 7—7 in FIG. 5. FIG. 7 more clearly illustrates the individual die fingers 58 having the die threads 54 formed on the interior arcuate surfaces thereof. In addition, FIG. 7 illustrates the tip of the tap cutting edge 64 formed on one of the tapping fingers 56.

In using either of the tap and die combinations illustrated in FIGS. 3–7, of course, an annular channel must have previously been formed in the body of the object to be threaded, the size of the annular channel, of course, a function of object material, thread criteria, etc. In order to cut the dual synchronized threads into the object, customary threading practices are utilized, the only difference being that the tap and die combinations of FIGS. 3–7 simultaneously cut the exterior male threads and interior female threads into the object, without regard to the rotational starting points of the synchronized threads, inasmuch as, by definition, the tap and die cutting threads on the combination tap and die are synchronized with each other.

Figure 8:
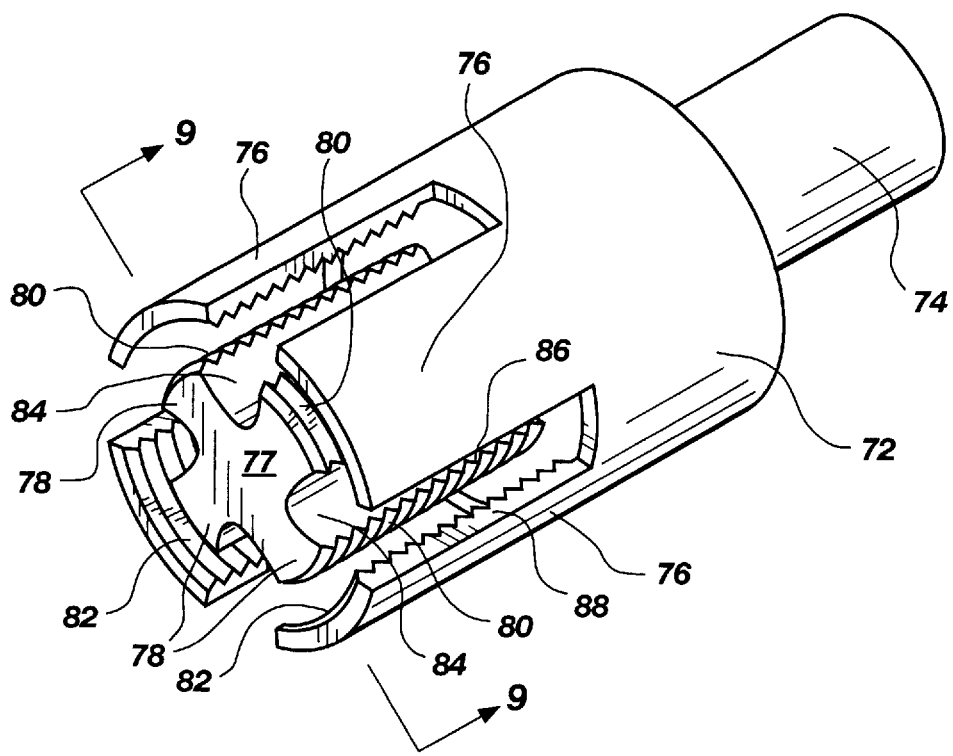
FIG. 8 is a perspective view of a combination die and tap for forming dual synchronized threads on the cylindrical section of the object that mates with the object that is formed with the combination tap and die of FIG. 3.

FIG. 8 is a perspective view of a combination die and tap 70 for use in simultaneously cutting external male threads and internal female threads on and in a cylindrical object, as in a pipe or tube. Understandably, the combination die and tap of FIG. 8 may be used to cut threads on the object that is intended to threadedly engage the corresponding object that has been threaded using either of the tap and die combinations of FIGS. 3–7. The combination die and tap 70 comprises a body portion 72 and a shank 74, the body portion including the thread cutting end which resembles a cylinder or pipe having a tap positioned concentrically in the center of the pipe. The cylinder includes four arcuate thread cutting fingers 76, each separated from its adjacent finger by a cut-out that functions as a flute (not numbered).

The individual arcuate thread cutting fingers 76 form a "die" portion, defined by die threads 82 on the internal surface thereof for cutting male threads on the external surface of the cylinder or pipe which is to be threaded. In addition, the combination die and tap 70 includes the concentric tap portion 77 having four thread tapping sections 78, each having a corresponding set of external tapping threads 80, oriented directly opposite respective die threads 82 positioned on respective arcuate thread cutting fingers 76. Of course, these tapping threads 80 and die threads 82 are synchronized with each other, having the same lead and rotational thread starting points that are relative to each other in a specific relationship. Each of the sets of tapping threads 80 is separated from its adjacent set by a flute 84, which also defines a tap cutting edge 86. Each set of die threads 82 also includes a die cutting edge 88 therebetween, defined by the flute between the individual arcuate thread cutting fingers 76. It can be appreciated that the tap cutting edges 86 and die cutting edges 88 are oriented at appropriate cutting angles in order to optimize the tap and die thread cutting of this combination die and tap.

Figure 9:
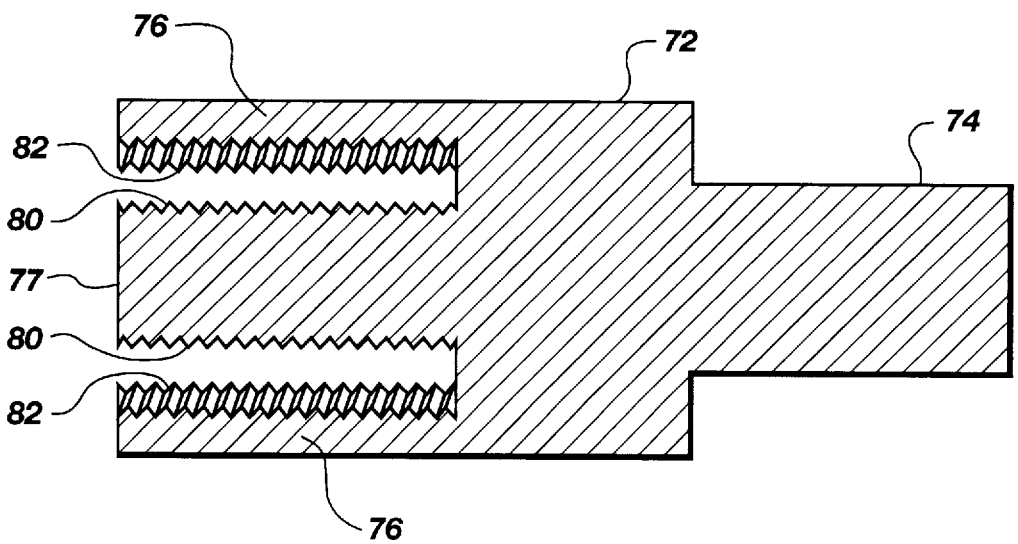
FIG. 9 is a sectional view taken diametrically along the longitudinal axis of the combination die and tap of FIG. 8, taken along lines 9—9 in FIG. 8.

FIG. 9 is a sectional view taken along the longitudinal axis of the combination die and tap 70 of FIG. 8, along lines 9—9 in FIG. 8. FIG. 9 illustrates the arcuate thread cutting fingers 76, each including respective die threads 82, and the concentric tap portion 77 and two of its sets of tapping threads 80.

The combination die and tap 70 of FIGS. 8 and 9 is used to simultaneously cut external male threads on and internal female threads in a cylindrical object, such as a pipe or conduit. Customary threading practices are utilized to cut these dual synchronized threads into the pipe, the only difference being that the combination die and tap 70 of FIGS. 8 and 9 simultaneously cuts the exterior male threads and interior female threads into the pipe, without regard to the rotational starting points of the synchronized threads, inasmuch as, by definition, the tap and die cutting threads on the combination die and tap are synchronized with each other.

It should be appreciated that the combination die and tap 70 of FIGS. 8 and 9 should be used in conjunction with a combination tap and die similar to the embodiments described in FIGS. 3–7 in order to form mating sets of dual synchronized threads in mating threaded objects. Specifically, the combination die and tap 70 of FIGS. 8 and 9 is utilized to cut dual synchronized threads on the end of a pipe or conduit, while the combination tap and die of FIGS. 3–7 is utilized to cut the mating synchronized dual threads into an annular channel formed in the body portion of a fluid device into which the just-mentioned pipe or fluid conduit is to be screw-threaded. It should also be appreciated that the die and tap combinations illustrated and decribed can be designed to cut mating synchronized dual tapered pipe threads, straight threads, etc., in any mating screw-threaded fluid connector commonly utilizing single sets of screw-threads.

Those skilled in the art will appreciate that dual synchronized threads may be formed using the combination tap and die of FIGS. 3–7, and the combination die and tap of FIGS. 8 and 9 used in a conventional milling machine, inasmuch as the thread leads and rotational starting points are, of course, set by the combination dies and taps. Conventional milling machines, however, do not have the ability to cut threads, as in a lathe, except with the combination taps and dies of the present invention. It is possible, however, to cut threads on an object utilizing a computerized numerically controlled (CNC) milling machine. The procedure for cutting dual synchronized threads on a CNC milling machine is describe with reference to FIGS. 10–12.

Figure 10:
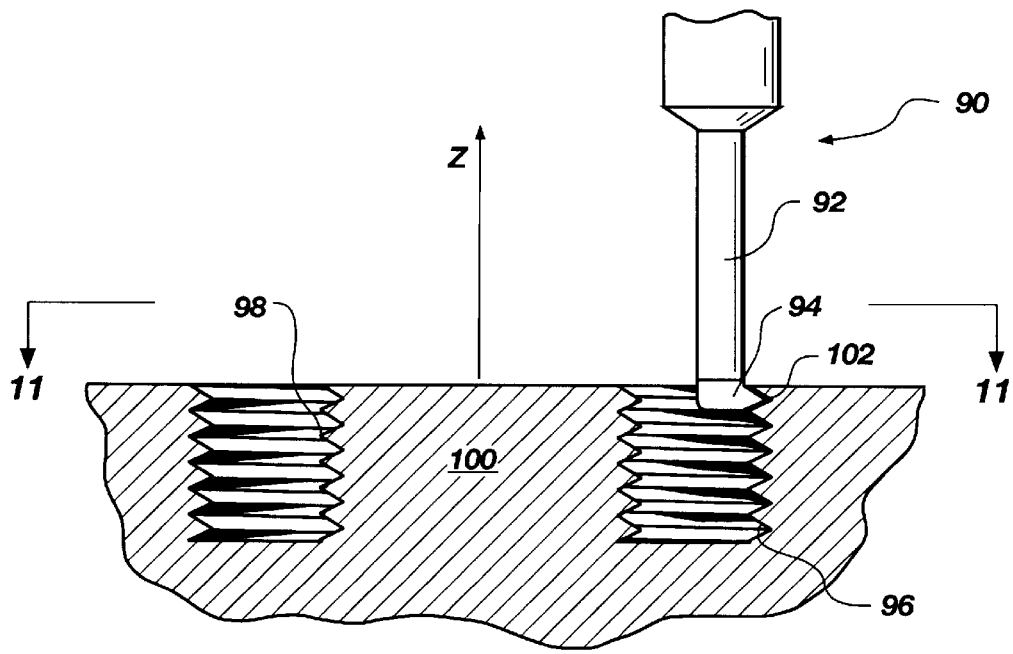
FIG. 10 is a side view taken in section diametrically along the longitudinal axis of an object having dual synchronized threads formed therein, illustrating the thread cutting tool and method for cutting dual synchronized threads using a computerized milling machine.
Figure 11:
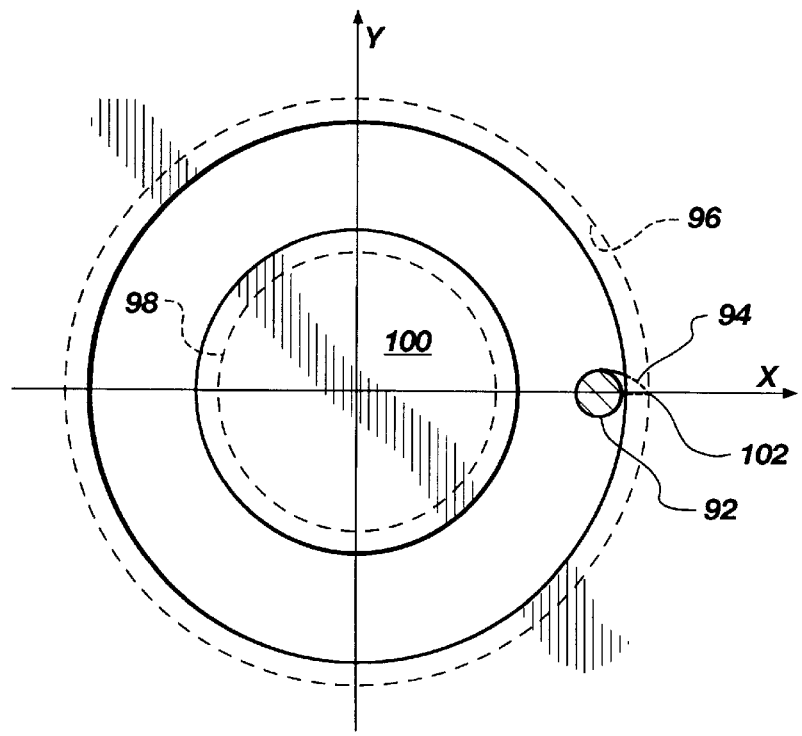
FIG. 11 is a top view of the object shown in FIG. 10, taken along lines 11—11 in FIG. 10.

FIG. 10 is a diametric cross-sectional view taken along the longitudinal axis of the dual synchronized threads to be cut in an object. In cutting threads with a milling machine, the customary thread cutting tool is called a hob 90, which comprises a stem 92 and a cutting edge 94. FIGS. 10 and 11 illustrate the positioning of the cutting edge 94 at the rotational zero point on the X-Y axis of the female threads 96 to be cut in the object.

The CNC milling machine is pre-programmed to initiate thread cutting at this rotational zero point in the X-Y plane, and at a specific vertical distance in the Z plane (see FIG. 10) that corresponds with the surface of the material. This computer program includes the thread diameter and thread lead, and synchronizes the rotation of the milling head and rotating thread cutting tool around the surface to be threaded with the appropriate vertical descent to provide the appropriate pitch lead. This is a common threading operation performed by CNC milling machines, and is called "helical interpolation."

In cutting the outside female thread, the appropriate rotational zero point 102 is determined in the X, Y and Z planes in order to locate this point in three dimensions. With this starting point, conventional helical interpolation will result in cutting the outside female threads to the appropriate depth within the annular channel which has been pre-cut or pre-formed into the object material 100.

To cut the inside male thread 98, the operator relocates the starting point of the hob cutting edge in the X, Y and Z planes in order to initiate the male threads 98 relative to the female threads 96, for instance at the same Y and Z locations, but at an X location less than the X location used in cutting the female threads 96. With this second rotational zero point established, computer controlled helical interpolation cuts the set of male threads 98 to the appropriate depth. It should be appreciated at this point that the dual synchronized theads 96 and 98 may have different rotational zero points in order to mate with specially configured mating threaded objects.

It should be noted that in helical interpolation, the amount of material removed during the thread cutting operation is determined by spindle speed and tool feed speed. Therefore, threads may be cut to full root depth in a single pass without overloading the thread cutting tool. This is customary in standard practice.

It should also be apparent to those skilled in the art that helical interpolation can be used to cut external and internal threads on the piece that is to mate with the dual synchronized threaded piece illustrated in FIGS. 10 and 11.

Figure 12:
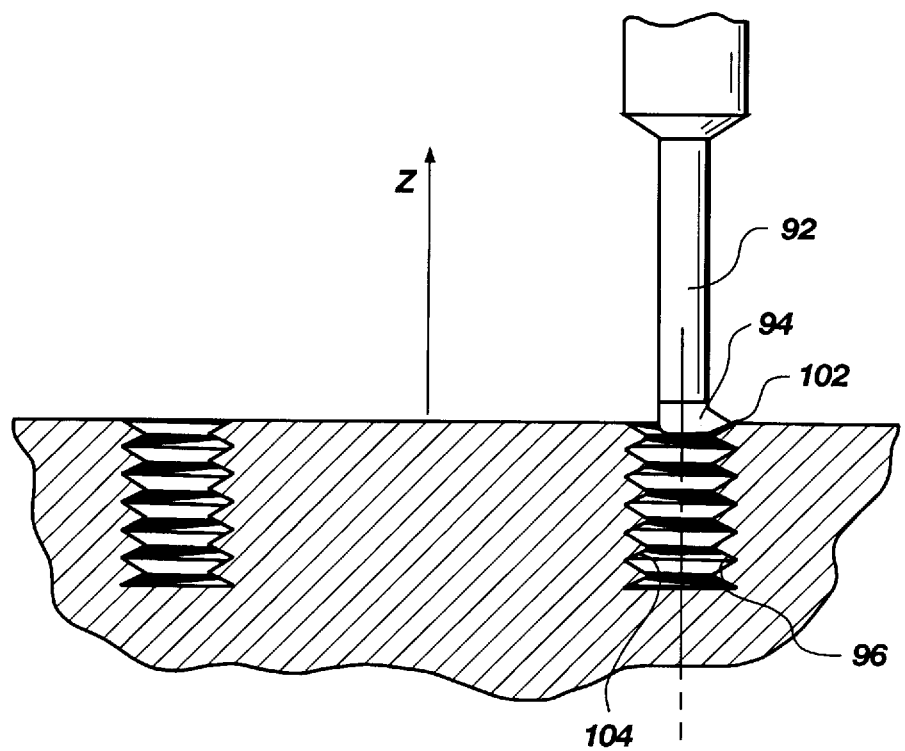
FIG. 12 is a partial sectional view similar to FIG. 10, illustrating the thread cutting tool as it is used to cut both the internal and external threads simultaneously.

FIG. 12 is a partial sectional view similar to FIG. 10, illustrating the concept of cutting both the internal female threads 96 and external male threads 104 simultaneously. Inasmuch as the thread cutting tool rotates within the milling machine head to cut the female thread 96, those skilled in the art will appreciate that the synchronized male threads 104 can be cut simultaneously, of course, the male and female thread diameters being inter-related and both related to the radius of the cutting edge 94 of the thread cutting hob 90. This is within the expertise of the skilled machinist.

From the foregoing, it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. A process for producing dual synchronized threads on an object comprising the steps of:

(a) securing the object in a machine suitable for forming threads on the object;

(b) adjusting the machine to form a desired thread lead on the object;

(c) providing a thread forming tool having a mounting base and internal and external thread forming surfaces, said internal and external thread forming surfaces being located relative to each other;

(d) defining a rotational zero point on the object where a first set of threads is to begin;

(e) forming said first set of threads, starting at said rotational zero point;

(f) moving said thread forming tool to a second point on the object relative to said rotational zero point where a second set of threads is to be formed;

(g) forming said second set of threads, starting at said second point.

2. The process as set forth in claim 1, wherein said second point on the object for beginning formation of the second set of threads is also the rotational zero point on the object.

3. The process as set forth in claim 1, wherein said second set of threads comprises a set of multiple threads.

4. A forming tool for producing dual synchronized threads on internal and external cylindrical surfaces of an object, said forming tool comprising a mounting base and internal and external thread forming surfaces, said internal and external thread forming surfaces being located:

equidistant from a mounting base longitudinal axis;

in a plane coincident with the mounting base longitudinal axis;

coplanar within a plane normal to the mounting base longitudinal axis;

and diametrically opposed relative to the mounting base longitudinal axis.

* * * * *